United States Patent [19]

Bomstein

[11] 3,710,961

[45] Jan. 16, 1973

[54] TRANSFER DEVICE

[75] Inventor: Jacques Bomstein, Paris, France

[73] Assignee: Establissements J. Berthelat et Fils, Paris, France

[22] Filed: June 17, 1970

[21] Appl. No.: 46,891

[30] Foreign Application Priority Data

June 17, 1969 France..................................6920059
Dec. 26, 1969 France..................................6945102

[52] U.S. Cl.............214/38 B, 214/38 D, 214/83.14, 214/83.22
[51] Int. Cl...............................................B65g 67/02
[58] Field of Search...214/38 B, 38 BA, 38 BB, 38 C, 214/38 D, 516, 517, 84, 83.22, 83.14

[56] References Cited

UNITED STATES PATENTS

| | | | |
|---|---|---|---|
| 1,011,019 | 12/1911 | Bomhoff | 214/38 D |
| 1,611,882 | 12/1926 | Budd | 214/38 D |
| 3,250,408 | 5/1966 | Daniluk et al. | 214/38 BA |
| 1,830,740 | 11/1931 | Leech et al. | 214/38 B X |
| 3,397,802 | 8/1968 | Hinchee | 214/517 X R |
| 8,534,057 | 12/1950 | Pride | 214/517 |
| 2,004,095 | 6/1935 | Hankins et al. | 214/38 B |
| 2,348,019 | 5/1944 | Norbom | 214/516 |

Primary Examiner—Robert G. Sheridan
Attorney—Waters, Roditi, Schwartz & Nissen

[57] ABSTRACT

A transfer device is provided for the loading and unloading of loads from a first station, e.g., a transport vehicle, to a second station, e.g. a loading platform. The device essentially comprises a transfer trolley including a main body having a plurality of transfer conveyor chains driven by a driving unit, and an extractor-pusher mechanism actuated by the conveyor chains via a transmission device. The extractor-pusher mechanism initially is placed beneath the load and, by means of a thrust or traction force imparted by the transmission device, transfers the load from the first station onto the main body for displacement of the load to the second station. The transfer trolley is further provided with rollers movable along rails for transverse movement of the trolley relative to the respective stations.

7 Claims, 4 Drawing Figures

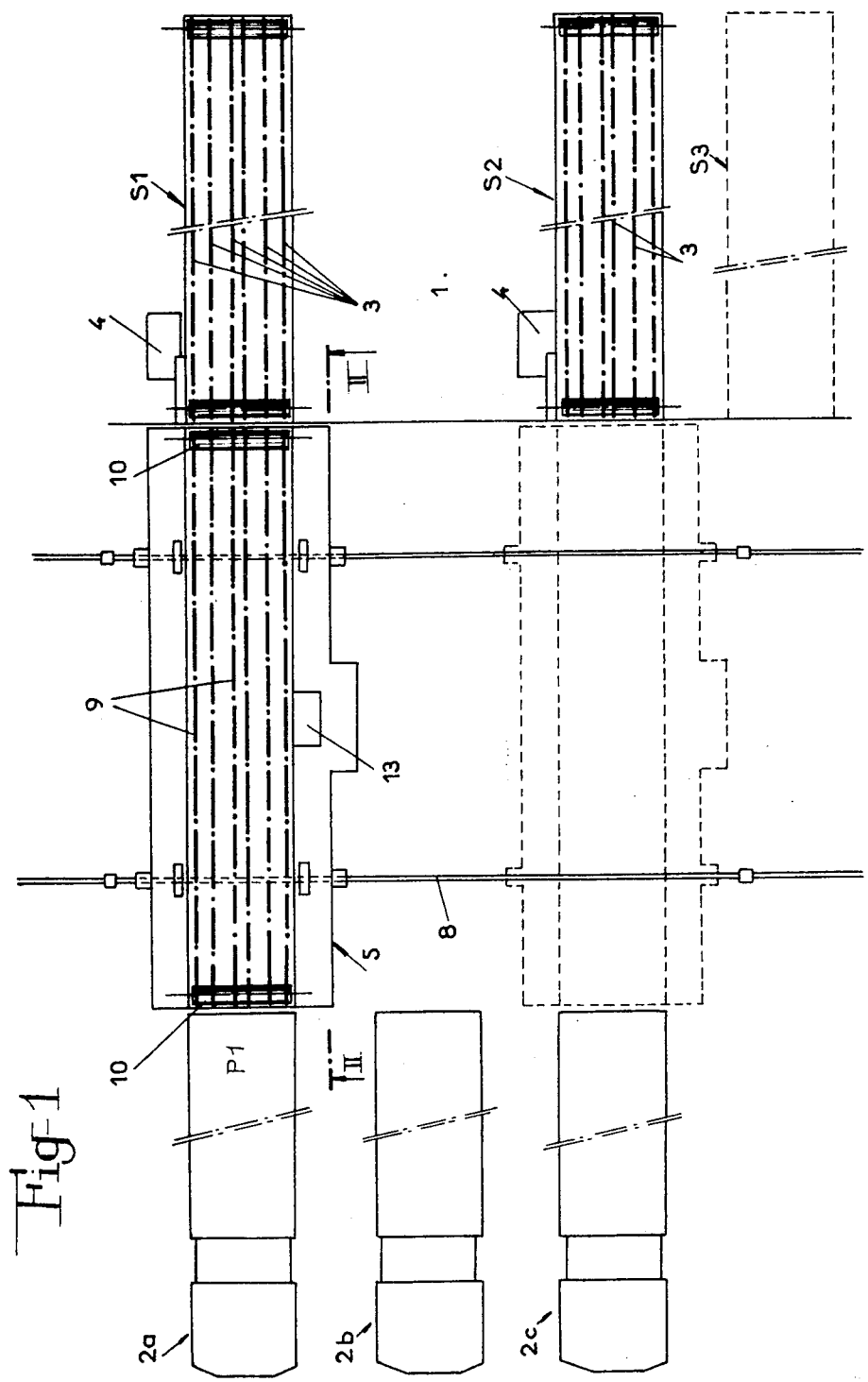

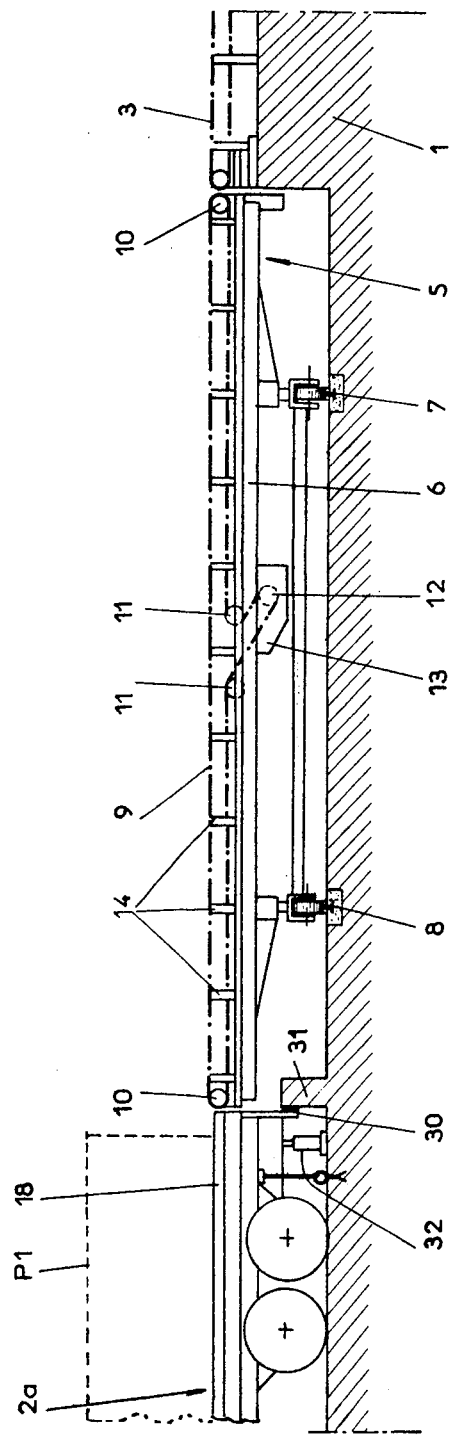

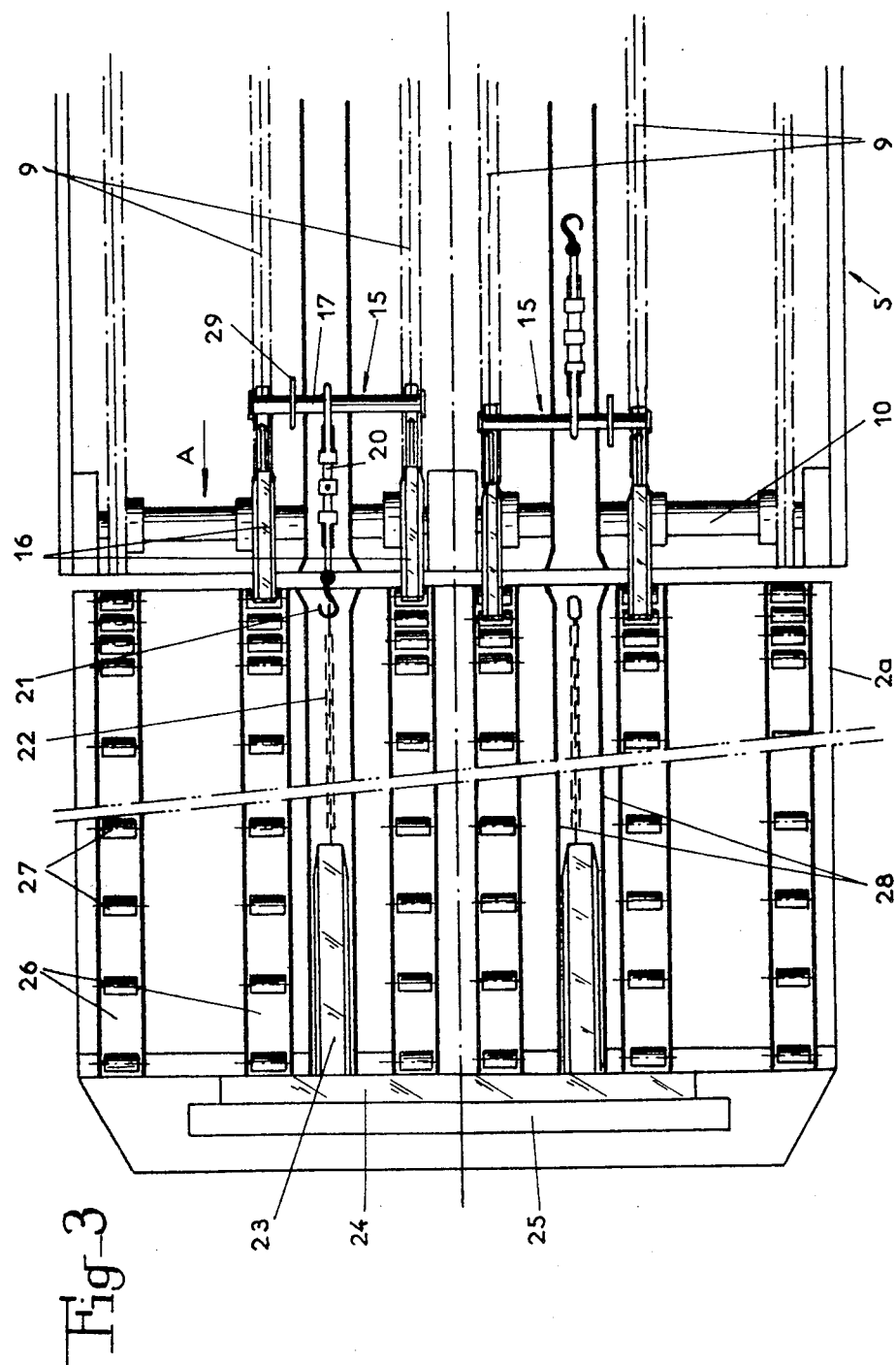

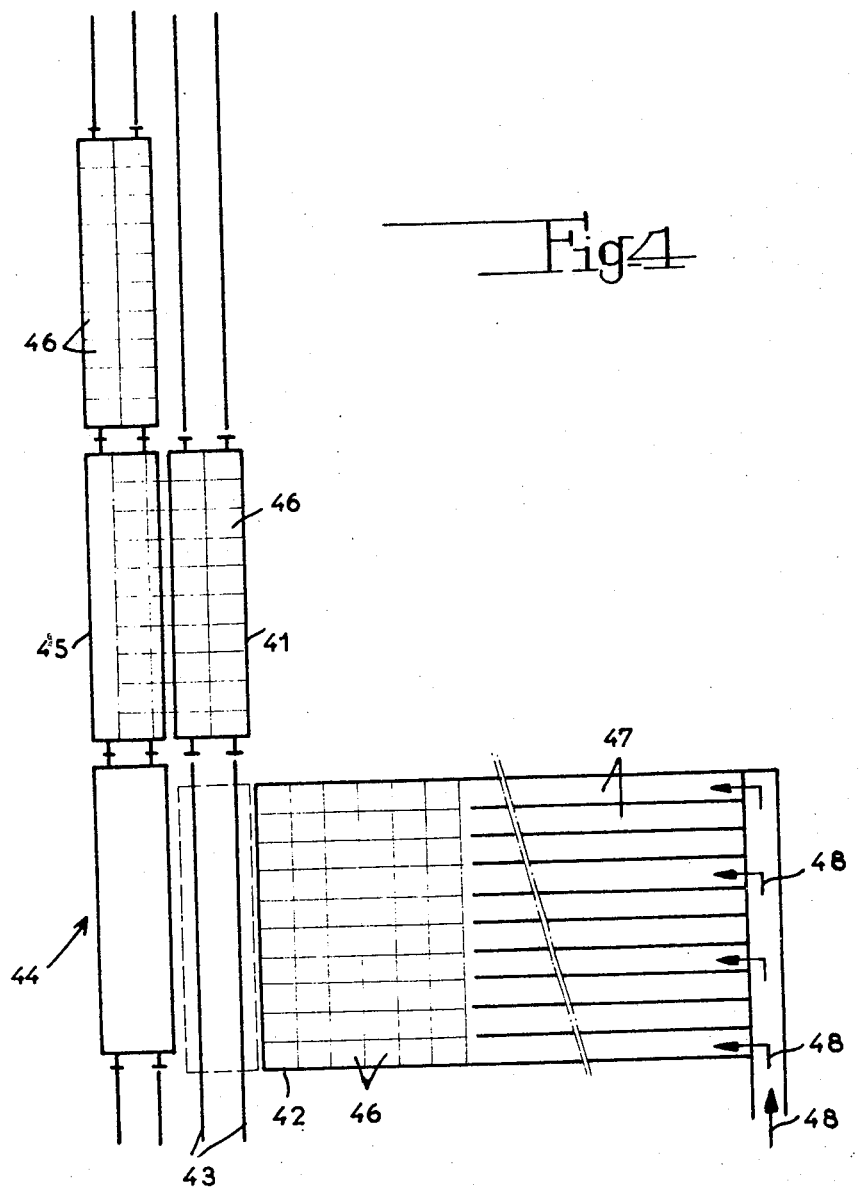

TRANSFER DEVICE

The present invention relates to a device for the complete transfer of a load between two separate supports, for example between a transport vehicle and an unloading platform and vice-versa.

Numerous transfer devices are already well known in the prior art. For example, Brit. Pat. No. 557,793 describes a transfer device mounted on the chassis of a transport vehicle, and which is capable of transferring loads between the vehicle and an unloading platform.

The transfer device comprises members for hauling and pushing the load, driven by an engine also mounted on the vehicle for the purpose of moving the loads on to guiding means provided on the vehicle and on the platform. However, although a device of this kind works perfectly, its cost is relatively high. It is in fact necessary to take into consideration the fact that each vehicle must be equipped with its own transfer device. On the other hand, equipment of this kind requires constant and difficult maintenance.

The German Patent application published under the No. 1,285,951 describes a device for transferring loads between a vehicle and a platform by means of a driving mechanism constituted by a winch-motor system mounted on the platform and operating in known manner, either on the front portion or on the rear portion of the load, depending on whether this latter is to be loaded on or unloaded from the vehicle. The transfer device according to this German Application overcomes the drawbacks indicated above, since only the platform is equipped with the winch-motor system, the vehicles being only provided with equipment of low cost. However, with a device of this kind, loading and unloading operations become long and difficult due to the fact that the vehicle must come in turn into station exactly opposite the loading point.

On the other hand, a device of this kind is suitable only for the loading of vehicles end-wise, and is not applicable for the case of side loading. Finally, this invention is only applied to the loading of pallets fitted with rollers and rolling on rails, and not to loads which are not provided with their own means of displacement.

Other transfer devices are also known which are only suitable for the loading of one load at a time and which are inoperative in the case of total loading of a group of loads not assembled to each other.

The present invention has for its object to remedy all these drawbacks, and is directed to a transfer device of relatively-low cost, simple in operation, which enables all transfer operations to be effected and which is suitable for the total loading and unloading of one or a number of loads of any kind.

To this end, the present invention relates to a transfer device for the total loading or the total unloading of a load or a group of independent loads which may be mounted on pallets and which are not necessarily equipped with their own means of displacement, the said device being characterized in that it is constituted by a transfer trolley moving on rails along a constant distance, formed between two separate parallel supports, constituted for example by a loading and unloading platform and by a row of transport vehicles parked in a set-back position with respect to the platform, the transverse dimension of the trolley with respect to the direction of movement being approximately equal to that of said constant distance, said load being capable of total diaplacement in a continuous manner along guiding means provided on the two supports and on the transfer trolley by the action of driving means mounted on the trolley and driven in reversible movement in the direction of the guiding means, by a driving means, also mounted on the trolley.

In a device of this kind, all the driving members which ensure the loading and unloading are thus arranged on the transfer trolley itself. The equipment of the vehicles is reduced to simple rolling ramps which facilitate the sliding movement of the load.

By virtue of its mobility, a single trolley can easily serve a long file of waiting vehicles in front of an unloading and supply platform. On the other hand, by virtue of the device according to the invention, it becomes possible to choose a driving means which is sufficiently powerful to effect the loading and unloading of a vehicle in a relatively short time. For example, a 12-meter half-trailer of 20 tons can be loaded in about 40 seconds. This possibility is practically excluded in the case where the driving means is mounted on the vehicle itself, since the overall size of such means and its relatively-high cost then constitute serious limitations.

The device according to the invention is equally well suited to the loading of a load mounted on pallets and to a load placed directly on the ground.

In this latter case, the load should however be sufficiently rigid for it to be handled totally. This is the case for example of containers, wooden cases or cardboard boxes. The load may also be constituted by a group of pallets, cases, containers, arranged in one or a number of superimposed layers.

In this case, loading and unloading are effected totally by moving all the loads.

No particular limitation needs to be applied to the nature of the supports. They may be constituted by a platform and by transport vehicles such as lorries, half-trailers, railway cars, and even ships and cargo aircraft.

According to a particular form of embodiment of the invention, the said displacement means are constituted by at least one chain conveyor, the movement of which is transmitted to a transmission device capable of applying to the load either a thrust so as to displace it totally from the transfer trolley to one of the two supports, according to the direction of drive of the conveyor, or a tractive force in order to displace it totally in the opposite direction.

According to a preferred form of embodiment of the invention, the transmission device is constituted by one or a number of push-rods designed so as to be applied directly on the load and connected together by at least one transverse rod capable of being connected to any point of the conveyor, the said rod being connected to the load by means of traction chains.

According to one particular form of embodiment, the traction chains are connected to the arms of a swingle-bar arranged at the rear portion of the load.

The transfer device also comprises means for adjustment of height such as lifting jacks or the like, designed so as to bring the platform of the trolley to the same level as the floor of the vehicle or as the unloading platform.

The invention will now be described below with reference to the accompanying drawings, given solely by way of example and not in any limitative sense. In the drawings:

FIG. 1 is a plan view diagrammatically illustrating a transfer trolley according to the invention, adapted for loading half-trailers in the end-on position from a platform;

FIG. 2 is a view in cross-section taken along the line II—II in FIG. 1;

FIG. 3 is a plan view of the extractor-pusher mechanism according to the invention, the upper half illustrating the position of the parts during the extraction of the load, and the lower half-view showing the position of the parts during the pushing of the load; and FIG. 4 is a plan view of the arrangement of a platform with a trolley according to the invention, for the purpose of side loading railway cars.

FIGS. 1 and 2 show a platform 1 arranged for loading and unloading lorries and half-trailers 2a, 2b, 2c. On the platform is arranged a series of pre-loading and unloading stations $S_1$, $S_2$ and $S_3$, each constituted by an elongated track. Each track is equipped with longitudinal conveyors 3. The conveyors 3 of the various stations are driven in forward or reverse movement by a corresponding operating drive 4.

Along the platform and in its immediate vicinity, a transfer device or trolley 5, comprising a platform 6 mounted on carrier wheels 7, moves on rolling rails 8 parallel to the edge of the platform 1.

On the floor of the transfer trolley, a driving mechanism is arranged in the longitudinal direction, constituted by conveyor chains 9 wound on two shafts 10 (see FIG. 2), mounted at the extremities of the transfer trolley, and traveling over two tension wheels 11 ensuring a regulation of the tension of the chains. The chains 9 engage shaft 12 of a driving means 13 for the translation movement of the chains. The chains are maintained in a horizontal position over the whole length of the trolley by means of supports 14 uniformly spaced apart and supported on the floor 6 of the trolley.

As shown clearly in FIG. 3, removable cleat devices 15 can be fixed at any desired point of the chains 9. Each of the said cleat devices is constituted by two longitudinal push-rods 16 coupled together by a transverse coupling bar 17. Each bar is connected at its extremities to one of the chains 9 in order to transmit to the load a thrust force when the chains are driven in movement in the direction of the arrow A, and a pulling force when the chains are driven in the opposite direction. During a movement in the direction of the arrow A, the free extremities of the push-rods 16 come into contact with the rear face of a load $P_1$ placed on a pallet 18 (see FIG. 2).

In order that the thrust force applied by the push-rods may be uniformly distributed over the whole length of the load, the push-rods are chosen in sufficient number, four in the form of embodiment shown in FIG. 3.

On each of the transverse bars is fixed an articulated coupling 20, terminating in a hook 21 which can be hooked in the last link of a chain 22, the other extremity of which is fixed to one of the arms 23 of a swingle-bar 24 normally supported against an abutment 25 provided at the front portion of the half-trailer 2a. On the floor of the half-trailer 2a are fixed rolling tracks 26 constituted by a number of longitudinal rows of rollers 27 each rotating about a transverse axis. The rollers 27 serve to facilitate the displacement of the load along the floor of the half-trailer. The arms 23 of the swingle-bar 24 extend longitudinally between guiding ramps 28 having a height slightly less than that of the rollers 27. The arms 23 are normally engaged under the pallet 18 carrying the load, while the body of the swingle-bar 24 is in contact with the rear face of the load $P_1$.

For reasons of safety, in the case of an error by the operator, a disc 29 actuating a limit switch contact is fixed on each of the coupling bars 17 in order to stop the operation of the driving means 13 at the end of the travel of the push-rods.

As shown in FIG. 2, in the loading and unloading position, an abutment 30 fixed at the rear of the half-trailer comes into contact with a stop-wall 31 extending parallel to the platform. The low wall is built at a distance from the platform such that the clearance existing between the floors of the half-trailers and the trolley is relatively small, for example of the order of 5 cm. The oscillations and variations in level of the half-trailer caused by the displacement of the load are effectively prevented by means of a brace 32 engaged under the rear portion of the half-trailer.

In FIG. 4, numeral 41 indicates a self-propelled transfer device identical with that of the preceding figures, the only difference residing in the fact that the transfer device of FIG. 4, is arranged parallel to the edge of the platform 42. The transfer device 41 can move on rails 43 between the platform 42 and a line 44 of railway cars 45, stationed at a pre-determined distance from the platform. The transfer device may be equipped with a traction and pusher mechanism with chains and cleats similar to that previously described and designed to effect the lateral transfer of a load 46 between the platform 42 and the cars 45 of the line 44. However, any other appropriate thrust device such as jacks, pushing trolleys, telescopic trolleys may also be employed.

The cars 45 are necessarily of the type with a total side opening, or with a flat floor, so as to permit complete access from the side. The displacement of the load on the cars 45 by the action of the push and pull device of the transfer apparatus is facilitated by ramps with rollers or by simple transverse slides (not shown) provided on the floors of the cars. The loads can be blocked in position on the cars by means of screw jacks or by any other appropriate device eliminating all risk of movement on the ramps or slides.

The unloading of the pallets, containers or cases from the cars 45 may be effected by the same transfer device by means of swingle-bars and traction chains such as those previously described, or by means of any other equivalent system such as jacks or extractor trolleys, etc.

As in the first embodiment, the platform 42 is constituted by a succession of elongated tracks provided with longitudinal conveyors 47 intended to carry the loads 46. These tracks are uniformly loaded, in the direction of the arrows 48 by a storage and distributing conveyor (not shown).

Numerous and varied loading and unloading operations can be carried out by means of the trolley according to the invention. By way of example, and to show the flexibility of use of a trolley of this kind, it is possible, as shown in FIG. 1, to unload at the unloading station $S_3$, the load $P_1$ initially placed on the half-trailer 2a, and then to load on the half-trailer 2a a load $P_2$ previously prepared on the pre-loading station $S_1$.

To this end, the half-trailer 2a is first brought into its correct position against the stop-wall 31 (FIG.2) by alignment with a strip formed on the ground perpendicular to the wall. The brace 32 is then engaged under the half-trailer in order to prevent variations of level of this latter. The transfer trolley 5 is then brought into alignment with the half-trailer 2a by causing it to roll on the rails 8. If necessary, an adjustment of the height of the trolley may be effected.

An operator then fixes the chains 22 on the device 15 by engaging the hooks 21 of the coupling 20 in the last link of the corresponding chain 22, as can be seen from the upper half of FIG. 3. The drive means 13 for the chains 9 is then actuated in the opposite direction to the arrow A. The tractive force applied by the chains 9 is transmitted by means of the chains 22 to the swingle-bar 24 which pushes the pallets 18 carrying the load $P_1$ in the direction opposite to the arrow A. The assembly of the pallets and the swingle-bar then moves longitudinally on the rollers 27, the bar being guided during the course of this movement by the co-operation of the arms 23 and the lateral guiding ramps 28.

Since the height of the trolley and that of the trailer floor are the same, the load is transferred without shock or tilting onto the chains of the trolley. As soon as the load $p_1$ has been completely placed on the trolley, the drive means 13 is immediately stopped. The cleats are then removed and the chains are unhooked. The trolley is then moved on the rails 8 until it comes into alignment with the unloading station $S_3$ in the position shown in broken lines in FIG. 1.

The drive means 13 is then again started-up, together with the operating unit 4, this latter causing a movement in the same direction of the mechanism 3 provided on the platform. The drive means 13 and the operating unit 4 are constructed in such manner that the driving speeds of the chains of the trolley and the chains of the mechanism 3 are substantially equal. The result is that the load $P_1$ moving at a pre-determined speed on the trolley continues to move at the same speed on the driving mechanism 3 until the load $P_1$ is correctly positioned on the unloading station $S_3$.

When the trolley has been freed from its load, it is moved on the rails 8 until it has been brought into alignment with the pre-loading station $S_1$ on which the load $P_2$ has been prepared. This load is also arranged on pallets resting on the chains of the driving mechanism. The operating unit 4 of the station $S_1$ and also the drive means 13 of the chains of the trolley are then simultaneously actuated in the direction of the arrow A, as shown in FIG. 3. When the load has been correctly positioned on the transfer trolley, the drive means 13 is stopped and the trolley is transversely moved until it comes opposite the half-trailer 2a. The pusher device 15 is then mounted on the chains 9 of the trolley behind the load $P_2$. When the drive means 13 is again actuated, the thrust force of the chains is applied through the intermediary of the push-rods 16, to the rear edge of the pallet 18 carrying the load. The result is that the pallet 18, pushed by the trolley, reaches the rollers 27 on which it slides until it comes into contact with the abutment 25.

It should be noted that the push-rods only come into action in the final phase of the loading in order to pack the pallets against each other. At the moment when the load passes onto the lorry, the swingle-bar 24 becomes introduced under the first pallet 18 and is located with its chains 22 on the floor of the half-trailer. This swingle-bar 24 will furthermore be employed during the subsequent unloading of the half-trailer 2a. The transfer trolley is then available to carry out a new operation.

The translation speed of the chains of the transfer trolley may be of the order of 18 meters per minute.

It will furthermore be understood that numerous modifications of details may be made to the embodiment described, in particular by the substitution of equivalent technical means, without departing from the scope of the invention.

For example, any other movement of the transfer device may be contemplated; the device may be pivotally mounted. On the other hand, it is possible to contemplate, instead of a moving transfer device, a fixed device mounted opposite the platform and having a height which is variable according to that of the vehicle to be loaded or unloaded. In order to carry out all the loading and unloading operations, the vehicles must pass in front of the fixed device.

What I claim is:

1. A transfer device for the loading or unloading of a load or of a group of loads all at once, said device comprising, in combination: a transfer trolley, two separate supports constituted by a loading and unloading platform and by transport vehicles adapted for being immobilized in a fixed position with respect to said platform, said two supports being separated by a constant distance, rails disposed between said supports, said trolley being movable on said rails between the two supports, the transverse dimension of said trolley with respect to the direction of displacement being approximately equal to that of said distance between the supports, guiding means on said transfer trolley and on said supports, load-displacing means mounted on said trolley for moving said load in a continuous manner along said guiding means, and a driving means also mounted on said trolley for actuating said load-displacing means for reversible movement, said driving means comprising at least one chain conveyor, a transmission device engageable with said chain conveyor to apply to the load either a thrust in order to displace said load as a unit from the transfer trolley towards one of said two supports, depending on the direction of movement of the conveyor, or a traction force in order to displace said load as a unit in the opposite direction, said transmission device comprising a plurality of push-rods adapted to act directly on the load and at least one transverse bar coupling said push rods together and adapted to be connected to said chain conveyor to apply thrust to said load, and a traction chain connectable to said transverse bar and to said load for transmitting traction force from said bar to the load.

2. A device as claimed in claim 1, comprising a swingle-bar disposed at the rear portion of the load, said traction chain being connected to said swingle-bar.

3. A device as claimed in claim 1, in which said platform is provided with a plurality of loading stations each including a conveyor for displacing the load, and driving means for actuating said conveyor independent of the driving means of the transfer trolley.

4. A device as claimed in claim 1, in which said guiding means comprises rollers.

5. A device as claimed in claim 1, for end loading and unloading of transport vehicles disposed perpendicularly to said platform, said device being arranged for movement perpendicularly to said platform.

6. A device as claimed in claim 1 wherein said driving means comprises a drive unit mounted on said trolley and in driving engagement with said chain conveyor.

7. A device as claimed in claim 1 wherein said driving means further includes a plurality of said chain conveyors arranged in parallel relation, adjacent chain conveyors being coupled by a respective transverse bar.

* * * * *